United States Patent [19]

Hsieh et al.

[11] Patent Number: 5,109,083
[45] Date of Patent: Apr. 28, 1992

[54] PROCESS FOR MAKING TACKY ACRYLATE MICROPARTICLES AND USE THEREFOR

[75] Inventors: Hsieh-Chang Hsieh; I-Chien Wei; Tsung-Tien Kuo, all of Kaohsiung, Taiwan

[73] Assignee: Taiwan Hopax Chemicals Mfg. Co., Ltd., Kaohsiung, China

[21] Appl. No.: 636,230

[22] Filed: Dec. 31, 1990

[51] Int. Cl.⁵ .................. C08F 4/40; C08F 220/10; C08L 1/28; C08K 5/42; C08K 5/06
[52] U.S. Cl. .................. 526/93; 526/328.5; 524/733; 524/745; 524/761
[58] Field of Search ........................................ 526/93

[56] References Cited

U.S. PATENT DOCUMENTS 3,691,140  9/1972  Silver .
3,857,731  12/1974  Merrill, Jr. et al. .
4,166,152  8/1979  Baker et al. .
4,495,318  1/1985  Howard .
4,598,112  7/1986  Howard .
4,786,696  11/1988  Bohnel .................. 526/88
4,810,763  3/1989  Mallya et al. .
4,814,373  3/1989  Frankel et al. ............ 524/460
4,833,179  5/1989  Young et al. .
4,839,416  6/1989  Orenstein et al. .

Primary Examiner—Joseph L. Schofer
Assistant Examiner—Wu C. Cheng
Attorney, Agent, or Firm—Hamilton, Brook, Smith & Reynolds

[57] ABSTRACT

The present invention pertains to a process for preparing clusters of infusible, inherently tacky, elastomeric, solvent-insoluble, solvent-dispersible polymeric microparticles by aqueous emulsion polymerization. The invention also pertains to an adhesive comprising the polymeric microparticles and to a repeatedly reusable pressure sensitive sheet material having the elastomeric microparticles coated thereon.

15 Claims, No Drawings

PROCESS FOR MAKING TACKY ACRYLATE MICROPARTICLES AND USE THEREFOR

BACKGROUND OF THE INVENTION

In the mid-1970's, the Minnesota Manufacturing and Mining Corp. (3M) introduced a product called POST-IT ™ which is made by coating pressure sensitive microsphere adhesives on a sheet material, such as paper, which can be repeatedly adhered to and removed from a substrate without damaging the surface of the substrate. The microspheres are prepared by suspension polymerization and employ oil soluble initiators (U.S. Pat. No. 3,691,140 issued to Silver and U.S. Pat. No. 4,166,152 issued to Baker). Emulsion polymerization employing water-soluble initiators, according to Silver, can result in a substantial amount of latex having extremely small particle size which are difficult to recover and, further, have undesirable solvent solubility for many applications as adhesives. Other processes for making microspheres by suspension polymerization techniques using oil-soluble initiators are described in U.S. Pat. Nos. 4,495,318 and 4,598,112 issued to Howard, U.S. Pat. No. 4,810,783 issued to Mallya, and U.S. Pat. No. 4,839,416 issued to Orenstein.

In most cases, the adhesive microspheres must first be recovered from liquid medium before they can be redispersed in proper organic solvents and coated onto an appropriate surface. The suspension polymerization process described in the above patents produces a finely dispersed suspension of adhesive microspheres which are difficult and labor intensive to recover from the liquid medium. Recovery techniques typically require a compatible solvent, such as methanol, to coagulate before filtration, or mechanical force, such as centrifuge, to remove the microspheres from suspension.

Recently, Young (U.S. Pat. No. 4,833,179) reported a method of producing polymeric adhesive particles by suspension polymerization which could be easily collected by gravity filtration. The adhesive particles have additional modifying moieties, such as macromolecular monomers, hydrophobic silicas, or reactive zinc salts, which distort the properties of the adhesive.

It would therefore be desirable to develop a process for producing elastomeric microparticles that can be easily recoverable from a polymer suspension, in a form suitable for use as an adhesive.

SUMMARY OF THE INVENTION

The present invention pertains to a process for preparing clusters of infusible, inherently tacky, elastomeric, solvent-insoluble, solvent-dispersible polymeric microparticles by aqueous emulsion polymerization. The invention also pertains to an adhesive comprising the polymeric microparticles and to a repeatedly reusable pressure sensitive sheet material having the elastomeric microparticles coated thereon.

According to the invention, an aqueous suspension comprising monomers having at least one substantially water-insoluble ester of alkyl acrylate or methacrylate, at least one stabilizer and at least one emulsifier is polymerized with a water-soluble, oil-insoluble redox polymerization initiator, whereby clusters of elastomeric microparticles are formed. The clusters can be recovered from suspension by filtration and the microparticles resuspended in an appropriate solvent. The dispersed microparticles can then be coated onto paper or other sheet material surfaces as an adhesive for self-adherent, removable and repositionable use.

DETAILED DESCRIPTION OF THE INVENTION

According to this invention, clusters of inherently tacky, elastomeric, solvent-insoluble, solvent-dispersible polymeric microparticles are prepared by aqueous emulsion polymerization. The polymerization is initiated by reacting an aqueous suspension comprising monomers having at least one substantially water-insoluble ester of alkyl acrylate or methacrylate, a stabilizer and an emulsifier with a water-soluble redox polymerization initiator to produce clusters of elastomeric microparticles. During the polymerization, the monomers form microparticles which gradually coagulate to form clusters. The clusters have a macroporous structure and thus, they can be readily recovered from suspension by filtration, decantation, or other means by which the clusters can be removed from the aqueous phase. Preferably, the polymerized microparticles form clusters having an average size above about 300 microns, preferably from about 300 to about 2,000 microns. The microparticles are spherical and have diameters in the range of from about 5 to about 200 microns.

After the clusters of elastomeric microparticles are formed and recovered from suspension, the clusters can be resuspended in a suitable organic solvent, such as n-hexane. The microparticles can then be dissociated from the clusters by mechanical means such as by agitation. Once the microparticles are dispersed within the organic solvent, they can be coated onto an appropriate surface, such as paper or other sheet material for use as an inherently tacky, elastomeric, infusible pressure sensitive adhesive. The adhesives are self-adherent and can be repeatedly removed and/or repositioned on a surface without substantially altering or destroying the adherent properties of the adhesive. Further, the pressure sensitive adhesives of this invention will not damage the surface to which it is attached, upon removal of the adhesive. The pressure sensitive adhesive produced according to this invention can be repeatedly used as removable labels, tapes, removable bulletin boards, etc. Other uses in which it would be desirable to repeatedly adhere and remove an item from a surface without damaging the surface are included within the scope of this invention.

Monomers which can be homopolymerized or copolymerized according to this invention comprise at least one water-insoluble ester of alkyl acrylate or methacrylate, namely isodecyl acrylate, isooctyl acrylate, 2-ethyl hexyl acrylate, n-butyl acrylate and isodecyl methacrylate. Other monomers which can be used for copolymerization are unsaturated mono- and dicarboxylic acids such as methacrylic acid, acrylic acid, fumaric acid, and the like. Other comonomers such as acrylonitrile, dibutyl fumarate, vinyl acetate, and the like also can be used. The amount of acrylate or methacrylate monomer used is from about 95 percent to about 100 percent, and correspondingly the amount of other monomers used is up to about 5 percent. In one embodiment, a preferred adhesive will comprise 99% by weight isodecyl acrylate (IDA) and 1% by weight methacrylic acid. This adhesive is prepared by aqueous emulsion polymerization described herein and in detail in the examples.

To enhance the cohesive strength of the microparticles in order to achieve infusibility, the monomers are internally cross-linked to some extent using a small amount of a multifunctional cross-linker, such as multifunctional acrylate, triallyl cyanurate, divinyl benzene and the like. The amount of crosslinker used can be from about 0.5 to about 1.5 percent by weight of the monomers, preferably about 1.0 percent by weight of the monomers.

Polymerization occurs by using a water-soluble redox system initiator which comprises a pair of oxidizing and reducing agents. The oxidizing agent is a persulfate such as ammonium persulfate, sodium persulfate, and the like, preferably ammonium persulfate. The concentration of the persulfate is from about 0.25% to about 1.0% by weight of the monomers, and preferably about 0.75% by weight of the monomers. The reducing agent is ethylenedinitrilotetraacetic acid sodium iron(+3) salt (EDTA-Fe(3+)) which needs to be reduced by a second reducing agent, such as sodium formaldehyde sulfoxylate. The concentration of EDTA-Fe(3+) and sodium formaldehyde sulfoxylate is about 0.05 percent and about 0.5 percent by weight of the monomers, respectively.

A stabilizer should also be employed to prevent droplets of the monomers from coalescing in suspension. The stabilizer includes but is not limited to methyl cellulose, hydroxy propyl cellulose, hydroxy propyl methyl cellulose and ethyl cellulose; however, other known stabilizers can be used. The amount of stabilizer used in the polymerization reaction is up to about 2.0 percent by weight of the monomers, preferably about 0.4 percent to about 1.0 percent by weight of the monomers.

In addition to the stabilizer, at least one emulsifier should be included in the suspension. The emulsifier can be anionic, such as sodium dodecyl benzene sulfonate, sodium salts of alkyl aryl ether sulfonates and the like, or non-ionic such as alkyl aryl polyether alcohols. Both anionic and non-ionic emulsifiers can be employed simultaneously in the reaction. The amount of emulsifier (either anionic or non-ionic) used in the polymerization typically ranges from about 0.2 to about 2.0 percent by weight of the monomers. Preferably, the amount of emulsifier is from about 0.4 percent to about 1.5 percent by weight of the monomers.

Other amounts of stabilizer or emulsifier can be used in this invention. However, use of high concentrations of stabilizer or emulsifier should be avoided because such concentrations may result in finely dispersed adhesive microparticles that are difficult to recover from the suspension by filtration.

This invention is further illustrated by the following non-limiting examples:

EXAMPLE 1

A 2 liter cylindrical glass reactor equipped with thermometer, reflux condenser, mechanical stirrer, and nitrogen inlet tube, was charged with 17.1 grams of 28% by weight active sodium alkyl aryl polyether sulphonate (Rohm & Haas Company, Triton TM X-200), 700 grams of de-ionized water, 3 grams of ammonium persulfate, 0.2 grams of EDTA-Fe(3+), and 4 grams sodium bicarbonate. The suspension was stirred at a speed of about 500 rpm. A nitrogen purge was kept over the batch throughout the reaction period. To the solution were added a premix of 392 grams of isodecyl acrylate, 4 grams of methacrylic acid and 4 grams of divinyl benzene and agitated for about 10 minutes. 80 grams of 2% by weight hydroxy propyl methyl cellulose (Aldrich Chemical Company, Inc. Catalog No. 20,032-8) were then added to the suspension and agitated for about 5 minutes. 2 grams of sodium formaldehyde sulfoxylate and 100 grams of de-ionized water were then added into the reactor and the whole mixture was allowed to polymerize for 90 minutes. During this period, the temperature of the mixture raised spontaneously to about 37° C. due to exothermic reaction, and microparticle clusters appeared and grew in size. The reaction temperature was then raised to 72° C. for two hours and then allowed to cool to room temperature after the reaction was completed.

The final mixture was recovered from the suspension by filtering through a piece of cheese cloth. The resultant clusters were about 67% by weight in solid, and the size of the clusters were from about 1,000 to about 2,000 microns. The wet clusters were dried in an oven. The yield of dried clusters was 88% by weight.

20 grams of resultant microparticle clusters were placed into a flask with 80 grams of n-hexane. The clusters were agitated in the solvent until the microparticles were separated from the clusters and dispersed within the solvent. The microparticle dispersion was then deposited onto paper and dried.

The coated paper was inspected with Scanning Electron Microscopy (SEM) for size and particle distribution. The majority of particles had diameters ranging from about 5 to about 200 microns. The coated paper was adhered to and repeatedly removed from paper substrates and did not show any visible damage on their surfaces.

EXAMPLE 2

The procedure of Example 1 was repeated except that isodecyl acrylate was replaced with isooctyl acrylate. The resulted clusters have size from about 1000 microns to about 2000 microns. The yield is 85% by weight.

EXAMPLE 3

The procedure of Example 1 was repeated except that isodecyl acrylate was replaced with 2-ethyl hexyl acrylate. The resulted clusters have size from about 1000 microns to about 2000 microns The yield is 80% by weight.

Equivalents

Those skilled in the art will recognize or be able to ascertain, using no more than routine experimentation, many equivalents to the specific embodiments of the invention described herein. Such equivalents are intended to be encompassed by the following claims:

We claim:

1. A process for preparing clusters of infusible, solvent-insoluble, solvent-dispersible, inherently tacky, elastomeric microparticles, comprising reacting a water-soluble redox initiator with an aqueous suspension comprising at least one stabilizer, at least one cross-linking agent, at least one emulsifier in an amount sufficient to produce monomer droplets having a particle size capable, upon polymerization, of forming microparticles individually being of from about 5 to about 200 microns in diameter, and monomers having at least one substantially water-insoluble ester of alkyl acrylate or methacrylate, under agitating conditions to produce a dispersion of the monomers in suspension, whereby the dispersed monomers polymerize forming clusters of elastomeric microparticles.

2. The process of claim 1, wherein the ester is isodecyl acrylate, isooctyl acrylate, 2-ethyl hexyl acrylate, n-butyl acrylate or isodecyl methacrylate.

3. The process of claim 1, wherein the ester is present at from about 95 percent to about 100 percent by weight of the monomers.

4. The process of claim 1, wherein the oxidizing agent of the redox initiator is ammonium persulfate or sodium persulfate.

5. The process of claim 4, wherein the ammonium persulfate or sodium persulfate is present at from about 0.25 to about 1 percent by weight of the monomers.

6. The process of claim 4, wherein the redox initiator further comprises ethylenedinitrilotetraacetic acid sodium iron(+3) salt (EDTA-Fe(3+)) and a second reducing agent.

7. The process of claim 6, wherein the EDTA-Fe(3+) is present at about 0.05 percent by weight of the monomers.

8. The process of claim 6, wherein the second reducing agent is sodium formaldehyde sulfoxylate.

9. The process of claim 8, wherein sodium formaldehyde sulfoxylate is present at about 0.5 percent by weight of the monomers.

10. The process of claim 1, wherein the stabilizer is methyl cellulose, hydroxy propyl cellulose, hydroxy propyl methyl cellulose or ethyl cellulose.

11. The process of claim 10, wherein the stabilizer is present at up to about 2 percent by weight of the monomers.

12. The process of claim 1, wherein the emulsifier is sodium dodecyl benzene sulfonate, sodium salts of alkyl aryl ether sulfonate, alkyl aryl ether sulfonate or alkyl aryl polyether alcohol.

13. The process of claim 12, wherein the emulsifier is present from about 0.5 to about 1.5 percent by weight of the monomers.

14. The process of claim 1, further comprising removing the elastomeric microparticle clusters from suspension by filtration.

15. The process of claim 1, wherein the elastomeric microparticles comprise from about 95 percent to about 99 percent by weight isodecyl acrylate and from about 1 percent to about 5 percent methacrylic acid.

* * * * *